UNITED STATES PATENT OFFICE.

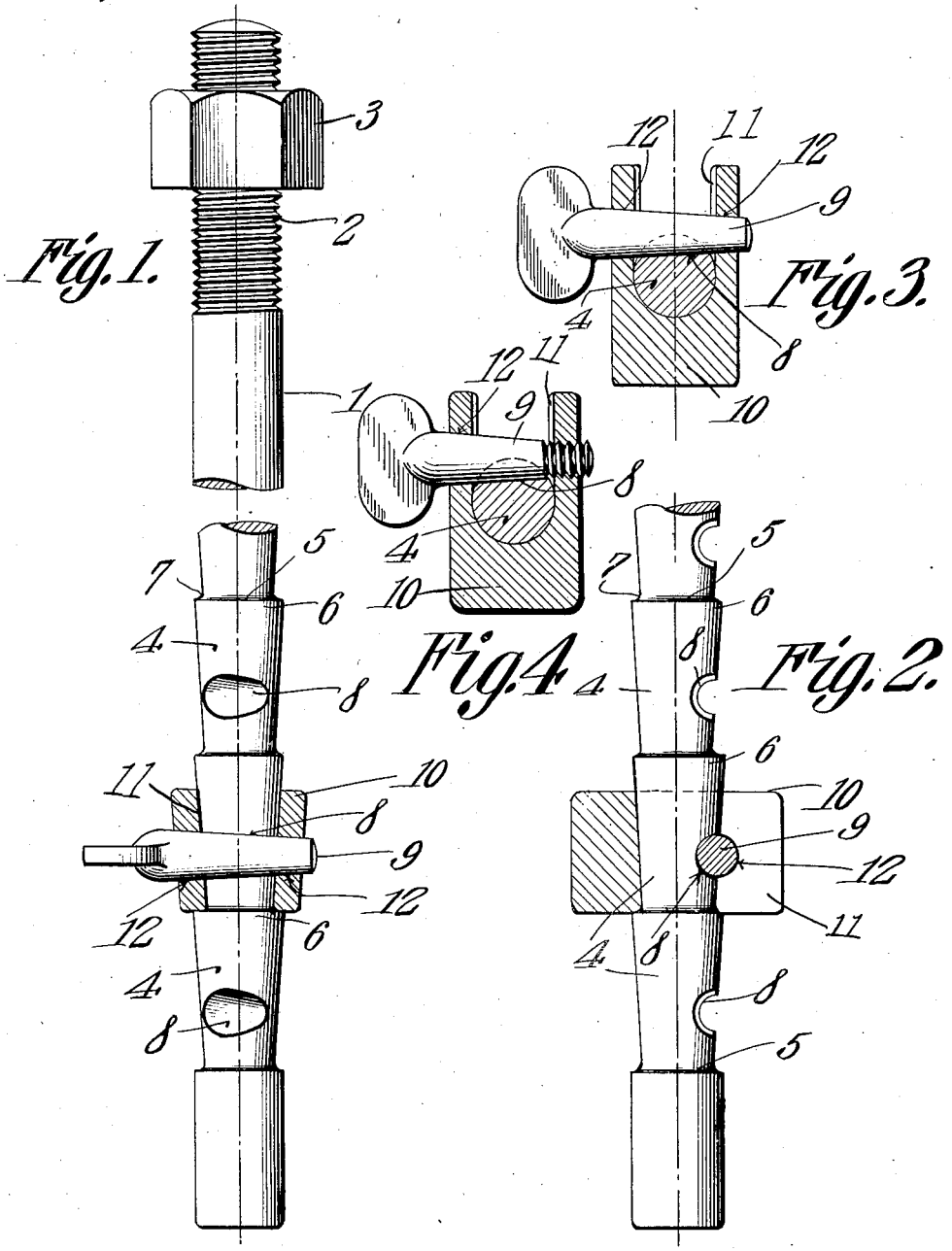

NICKOLAS W. TRAUTNER, OF RED WING, MINNESOTA, ASSIGNOR OF TWO-FIFTHS TO HENRY C. KOHN, OF RED WING, MINNESOTA.

QUICKLY-ADJUSTABLE BOLT.

939,933.  Specification of Letters Patent.  Patented Nov. 9, 1909.

Application filed May 6, 1909.  Serial No. 494,243.

*To all whom it may concern:*

Be it known that I, NICKOLAS W. TRAUTNER, a citizen of the United States, residing at Red Wing, in the county of Goodhue and State of Minnesota, have invented a new and useful Quickly-Adjustable Bolt, of which the following is a specification.

This invention has relation to quickly adjustable bolts especially adapted to be used for holding work upon the bed of machine tools and it consists in the novel construction and arrangement of its parts as hereinafter shown and described.

In the accompanying drawing Figure 1 is a side elevation of the bolt with parts broken away and part in section. Fig. 2 is a side elevation of the lower portion of the bolt, the view taken at a right angle to the view illustrated in Fig. 1. Fig. 3 is a transverse sectional view of the bolt. Fig. 4 is a transverse sectional view of a modified form of the bolt.

The bolt 1 is provided with a threaded extremity 2 upon which is screwed a nut 3. The opposite end portion of the bolt 1 is provided with a series of frusto conical portions 4. The frusto conical portions 4 are concentrically arranged with relation to the axis of the bolt 1 and each portion has a smaller end 5 which merges into the larger end 6 of an adjacent portion forming the shoulders 7. Each conical portion 4 is provided in its side with a tapered notch 8 which is adapted to receive the intermediate portion of a key pin 9.

A U-shaped nut 10 is provided with a recess having inclined walls 11 and the said recess is adapted to receive the frusto conical portion 4 of the bolt 1. The nut 10 is further provided in its opposite sides with registering perforations 12 adapted to aline with the notches 8 and when in alinement with any particular notch may receive the key pin 9. Thus means are provided for positioning the nut 10 upon any one of the conical portions 4 of the bolt and for securing the same. In the form of key pin, as shown in Fig. 3, the same is devoid of thread but is slightly tapered, while in the form as shown in Fig. 4, the key pin is provided at one end with a thread which engages a corresponding thread in one of the perforations 12 in the nut 10.

Having described my invention what I claim as new and desire to secure by Letters Patent is:—

1. A bolt having a threaded portion, a nut located upon the threaded portion, said bolt having a series of conical portions, and a nut having a recess provided with inclined walls adapted to receive the conical portions of the bolt.

2. A bolt having a threaded portion and a series of conical portions, each conical portion having a laterally disposed notch, said bolt having a threaded extremity, a nut located upon said extremity, a nut having a recess provided with inclined walls adapted to receive one of the conical portions and a key pin passing through the said nut and adapted to enter the notch in the conical portion.

3. A bolt having a threaded extremity, a nut located upon said extremity, said bolt having a series of mutilated frusto conical portions, a nut having a recess with inclined walls adapted to receive one of the conical portions and a securing device carried by the last said nut for engagement with the mutilated portion of the said conical portion.

In testimony that I claim the foregoing as my own, I have hereto affixed my signature in the presence of two witnesses.

NICKOLAS W. TRAUTNER.

Witnesses:
C. P. DIEPENBROCK,
H. C. KOHN.